United States Patent [19]

Köbler

[11] 4,205,887

[45] Jun. 3, 1980

[54] PRINTING MACHINE CYLINDER BEARER CONSTRUCTION

[75] Inventor: Ingo Köbler, Gessertshausen, Fed. Rep. of Germany

[73] Assignee: Maschinenfabrik Augsburg-Nurnberg Aktiengesellschaft, Augsburg, Fed. Rep. of Germany

[21] Appl. No.: 946,203

[22] Filed: Sep. 27, 1978

[30] Foreign Application Priority Data

Oct. 8, 1977 [DE] Fed. Rep. of Germany ....... 7731209

[51] Int. Cl.[2] ...................... F16C 13/00; F16C 17/02; F16C 25/00

[52] U.S. Cl. ...................................... 308/61; 308/203; 308/237 A

[58] Field of Search ...................... 308/36, 37, 59, 61, 308/74, 75, 135, 161, 237 A, 203; 33/168 R; 85/51; 403/311, 312, DIG. 7

[56] References Cited

U.S. PATENT DOCUMENTS

| | | | |
|---|---|---|---|
| 650,753 | 5/1900 | Gibson | 85/51 |
| 1,432,294 | 10/1922 | Jungk | 85/51 |
| 1,452,165 | 4/1923 | Michael | 85/51 |
| 1,452,492 | 4/1923 | Carpenter | 85/51 |
| 1,593,798 | 7/1926 | Durham | 85/51 |
| 1,597,525 | 8/1926 | Knake | 85/51 |
| 2,362,069 | 11/1944 | Huck | 101/216 |
| 2,658,699 | 11/1953 | Rovas | 85/51 |
| 3,491,647 | 1/1970 | Frazier | 85/51 |
| 3,690,253 | 9/1972 | Dreyer | 101/217 |

FOREIGN PATENT DOCUMENTS 937479 9/1963 United Kingdom .................... 308/135

OTHER PUBLICATIONS

Fischer, "Cylinder Circumference Ratios in Web and Sheet-fed Offset Presses", *Printing Machinery News* 63, pp. 1-23.

*Primary Examiner*—Richard R. Stearns

*Attorney, Agent, or Firm*—Frishauf, Holtz, Goodman & Woodward

[57] ABSTRACT

To permit replacement of a cylinder bearer ring without disassembly of the respective cylinder from the printing machine, the cylinder bearer ring is constructed as a composite element assembled of two parts 1, 9; one of the parts has a central, generally U-shaped cut-out to surround the shaft of the associated cylinder, the width of the cut-out being at least as large as the width of the diameter of the shaft; the other part, 9, fits into the cut-out and is formed with a central part-circular recess to surround the shaft. The two parts 1, 9, when interfitted, surround the shaft and form a continuous circular outline and thus a continuous bearer ring. The parts are secured together by bolts. Preferably, the engaging surfaces of the parts are formed with planes which are inclined with respect to a plane parallel to the facing side of the rings, so that, as the two parts run off against the associated bearer ring, there is no sudden transition of one part with respect to the other since the inclined surfaces will overlap axially. The cut-out is positioned at a circumferential region opposite that where the groove of the cylinder is located.

10 Claims, 4 Drawing Figures

PRINTING MACHINE CYLINDER BEARER CONSTRUCTION

The present invention relates to a cylinder bearer ring for rotary printing machines to fix the axial distances between respective cylinders of printing machines, and more particularly to printing machines having blanket cylinders formed with grooves provided to include clamping arrangements to clamp printing blankets or printing plates thereto.

BACKGROUND AND PRIOR ART

The cylinder bearer rings are engaged with substantial engagement pressure. They are subject to substantial shock loading which occurs when the clamping grooves in the printing cylinders roll off against the associated cylinders. The bearer rings, thus, have a limited life and have to be replaced from time to time. The bearer rings are usually located on the facing ends of the printing cylinders, inside of the side walls of the printing press. To replace the bearer rings, it is thus necessary to disassemble the printing cylinder as well. Replacement of the bearer rings, thus, is very time-consuming and labor intensive.

THE INVENTION

It is an object to provide a bearer ring construction in which replacement is facilitated.

Briefly, the bearer ring is made of two parts which are portions of a ring-shaped disk element, one of which essentially surrounds the shaft, and is formed with a U-shaped cut-out, having a width about that of the shaft. The other part fits into the U-shaped cut-out, and is formed with a recess to fit around the shaft. The two parts are held together by means of bolts. Preferably, the engagement surfaces are arranged in a slant with respect to the axis of the bearer ring, so that, as the bearer ring rolls off on an adjacent one, there is no abrupt change in engagement surface between the two parts, since they will form an axially inclined junction. The bolts holding the elements together can then pass axially through the fitting inclined engagement surfaces. The cut-out is preferably positioned at a circumferential region which is opposite to where the groove of the associated cylinder is located.

The bearer rings of this construction are capable of accepting substantial shock loading and engagement pressures but still can be easily replaced without disassembling the entire printing cylinder of the printing machine. The loading capability, particularly with respect to shocks, is fully ensured since the cut-out of the ring is located at a region remote from the cylinder grooves.

The arrangement in which the engagement walls are inclined with respect to the facing end surfaces of the rings is particularly preferred since transition from one ring-shaped part to the other will be smooth and soft since both ring-shaped parts will have overlapping engagement surfaces.

Drawings, illustrating a preferred example, wherein.

Figure 1:
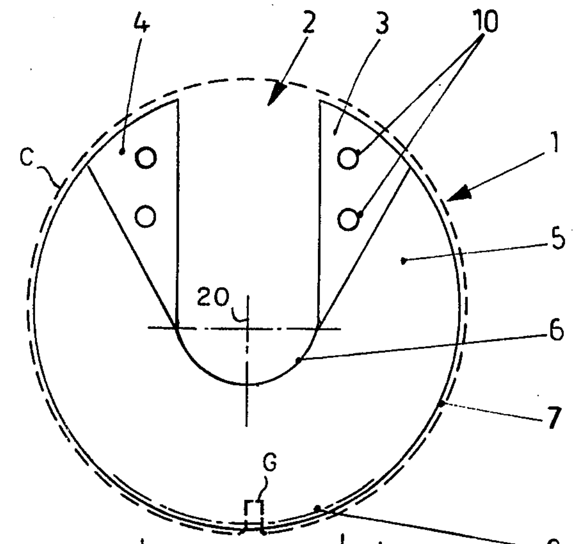
FIG. 1 is a schematic front view of one part of the bearer ring.
Figure 2:
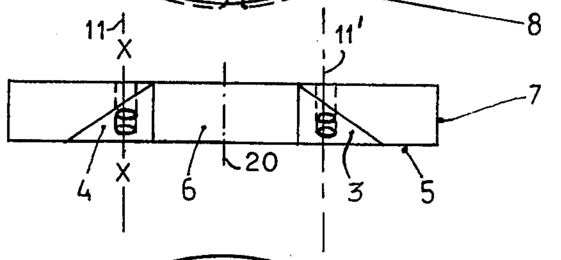
FIG. 2 is a top, to the same scale as FIG. 1, of the one part.
Figure 3:
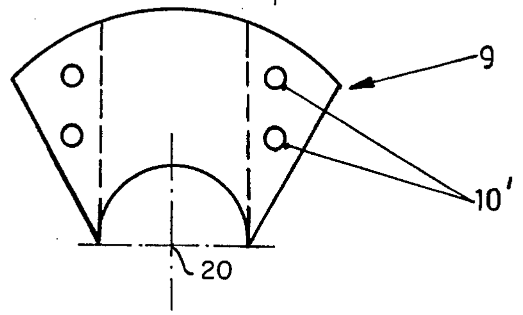
FIG. 3 is a front view of the other part of the bearer ring.

The entire ring is a composite made of two parts, 1, 9 (FIGS. 1, 3). The part 1 has a cut-out 2 which has a width which matches the diameter of the shaft of the printing cylinder with which it is to be associated. The shaft itself is shown schematically only by the center line 20 thereof. The lateral walls 3, 4, which define the U-shaped cut-outs, are inclined with respect to a plane parallel to the end surface 5 of the ring, as best seen in FIG. 2. The angles formed by the two walls 3, 4 preferably are the same and are directed counter each other. The cut-out 2 is defined at its lower region by a semicircular cylindrical surface 6 and is open towards the top. The running surface 7 has a region 8 opposite the cut-out, indicated in chaindotted lines. When mounting the bearer ring, the cylinder groove G or clamping groove of the associated cylinder C is to be placed in that region 8, opposite the cut-out 2. This permits adjustment of the bearer ring. For example, if the bearer ring has become deformed due to shock occurring when the clamping grooves of the associated cylinders roll off, the ring can be rotated within the region 8 by an angular distance sufficient to avoid the effect of damage with, or counter, the direction of rotation of the opposite bearer ring in order to provide a new, undamaged running surface.

Figure 4:
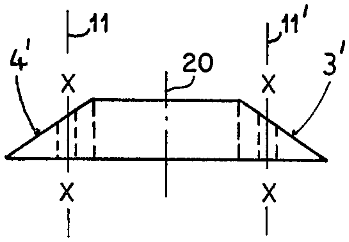
FIG. 4 is a top view thereof, to the same scale as FIG. 3.

The second part 9 is seen in FIGS. 3 and 4 and is shaped to match the cut-out 2. The part 9 likewise is formed with inclined side walls 3', 4' having angles which fit against the surfaces of the side walls 3, 4 of the part 1. Both elements are connected by bolts, schematically shown at 11, 11', which pass through suitable openings 10, 10' formed in the respective parts 1 and 2, and passing through the walls 3, 4 and 3', 4'. These axial bolts 11, 11' provide secure attachment of the parts with respect to each other.

Various changes and modifications may be made within the scope of the inventive concept.

I claim:

1. For combination and assembly in a printing machine in which at least one printing cylinder has a clamping attachment groove, and at least one cylinder bearer ring is provided surrounding the shaft (20) of the printing cylinder, said bearer ring being adapted to have radial pressure applied thereto by another bearer ring, wherein, in accordance with the invention, the cylinder bearer ring comprises a composite bearer ring formed as a ring-shaped element assembled of two parts (1, 9);

one of the parts (1) having a central, generally U-shaped cut-out surrounding the shaft of the associated cylinder, the width of the cut-out being at least as wide as the diameter of the shaft;

and the other part (9) fitting into the cut-out, and formed with a central part-circular recess surrounding the shaft;

said parts (1, 9), when interfitted, surrounding the shaft and forming an outer continuous circular outline;

and means (10, 11) attaching said parts together.

2. Composite bearer ring assembly according to claim 1, wherein the cut-out is positioned at a circumferential region opposite to that of the groove in the cylinder associated with the bearer ring assembly.

3. Composite bearer ring assembly according to claim 1, wherein the minimum width of the cut-out (2) is unvarying throughout its length.

4. Composite bearer ring assembly according to claim 1, wherein the ring is disk-shaped;

the parts are formed with wall portions (3, 4; 3', 4') adjacent the cut-outs; and the wall portions of both said parts are inclined with respect to a plane parallel to the end face of said disk-shaped ring to provide for overlap of the junction of the walls of said two parts and an overlapping, continuous circumference.

5. Composite bearer ring assembly according to claim 4, wherein the angles formed by the walls (3, 4; 3', 4') at opposite sides of the cut-outs are the same and directed counter each other.

6. Composite bearer ring assembly according to claim 4, wherein the attachment means comprise bores (10, 10') passing axially through the inclined walls and bolt means (11, 11') passing axially through said bores in the regions of said walls (3, 4; 3', 4').

7. Composite bearer ring assembly according to claim 6, wherein the cut-out is positioned at a circumferential region opposite to that of the groove in the cylinder associated with the bearer ring assembly.

8. Composite bearer ring assembly according to claim 7, wherein the minimum width of the cut-out (2) is unvarying throughout its length.

9. Composite bearer ring assembly according to claim 4, wherein the cut-out is positioned at a circumferential region opposite to that of the groove in the cylinder associated with the bearer ring assembly;

and wherein the minimum width of the cut-out (2) is unvarying throughout its length.

10. Composite bearer ring assembly according to claim 1, wherein the two parts (1, 9) fit into each other.

* * * * *